United States Patent [19]

van de Zee et al.

[11] 4,331,625

[45] May 25, 1982

[54] SOCKET PIPE

[75] Inventors: Jelle van de Zee, Dalfsen; Arién Breunis, Hattem, both of Netherlands

[73] Assignee: Wavin B.V., Netherlands

[21] Appl. No.: 93,597

[22] Filed: Nov. 13, 1979

Related U.S. Application Data

[60] Division of Ser. No. 958,805, Nov. 8, 1978, which is a continuation of Ser. No. 764,421, Feb. 7, 1977, abandoned.

[51] Int. Cl.³ .............................................. B29O 23/00
[52] U.S. Cl. ................................... 264/249; 264/296; 264/322; 425/392
[58] Field of Search ....................... 264/296, 322, 249; 425/392, 393

[56] References Cited

U.S. PATENT DOCUMENTS

| | | | |
|---|---|---|---|
| 3,715,800 | 2/1973 | Leopold | 264/296 X |
| 3,956,817 | 5/1976 | Blumenkranz | 264/249 X |
| 4,131,407 | 12/1978 | de Putter | 425/393 |

*Primary Examiner*—Thomas P. Pavelko
*Attorney, Agent, or Firm*—Ostrolenk, Faber, Gerb & Soffen

[57] ABSTRACT

Socket pipe of thermoplastics having a groove with longitudinally extending additional recess, which groove is bound by a radially extending head portion.

5 Claims, 4 Drawing Figures

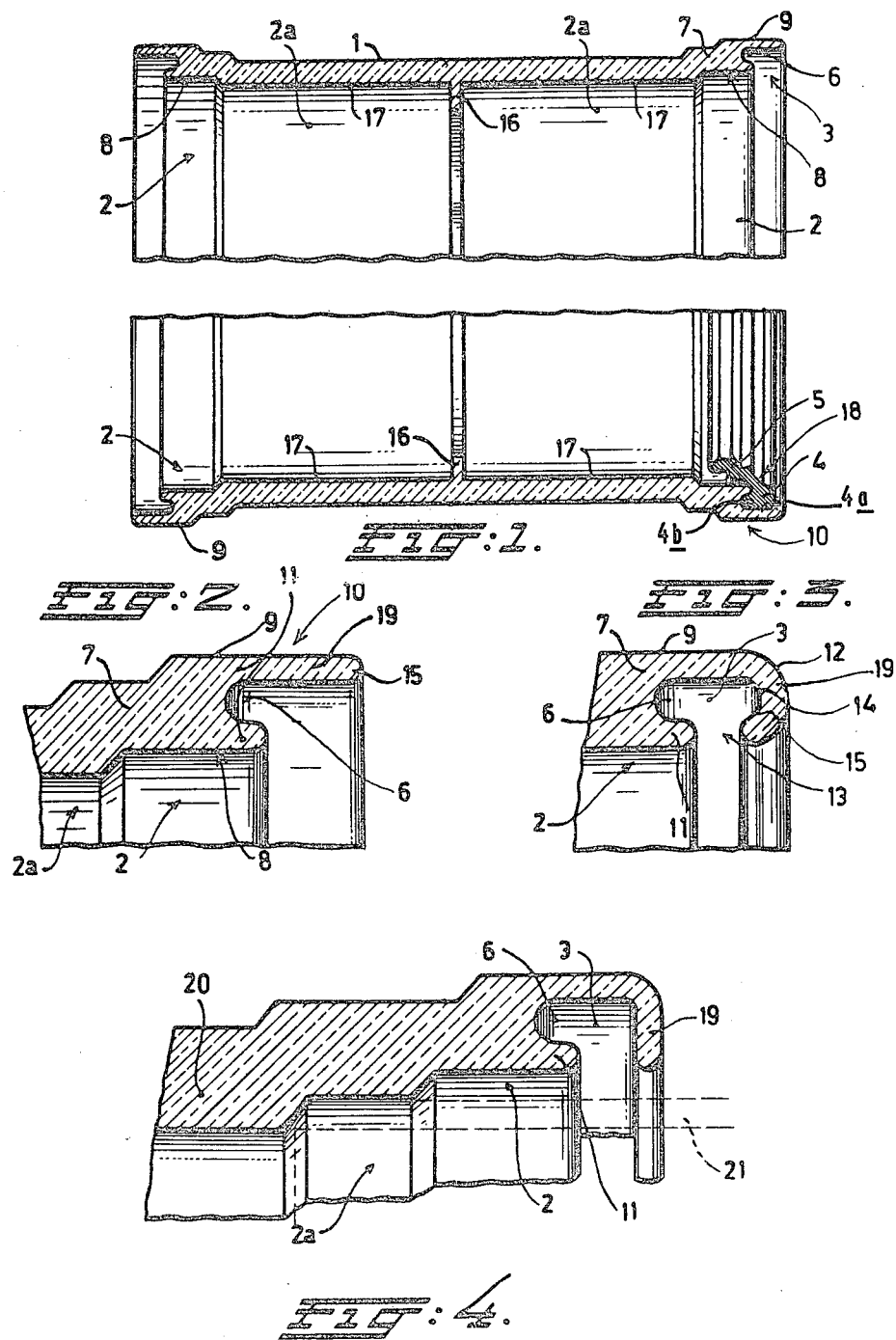

SOCKET PIPE

This is a divisional of Ser. No. 958,805, filed Nov. 8, 1978, which is a continuation application of Ser. No. 764,421, filed Feb. 7, 1977, now abandoned.

BACKGROUND OF THE INVENTION

The invention relates to a plastics socket pipe, that is an injection moulded socket pipe of thermoplastics material with a groove for receiving a ring-shaped portion of a sealing body, said groove being bound by a radially extending head portion.

An injection moulded socket pipe of thermoplastics material of this type is known per se. In this known injection moulded socket pipe, the groove is formed by upsetting the head portion axially as a result of which, in consequence of narrowing, the desired injection moulded socket pipe is obtained.

This known injection moulded socket pipe has, however, the drawback that the manufacture is rather intricate and demands quite some time as well as complex equipment since use has to be made of various machine parts for obtaining the desired narrowing.

It is another drawback of this known injection moulded socket pipe that the free end of the head portion extends in axial direction so that, in case of a free fall on the bottom, this free end of the head portion extending in axial direction may easily break off, due to which the socket pipe is in most cases unsuitable for further use. This applies the more so as, in case of certain thermoplastic materials falling, the crack occurs exactly in the most outward, radially extending portion of the groove.

SUMMARY OF THE INVENTION

The invention aims to provide a socket pipe of thermoplastics material of the above type not presenting these drawbakcs, which is easily manufactured so that the risk is avoided of breaking off part of the head portion extending in axial direction.

According to the invention, this is achieved by a socket pipe of thermoplastics material with a groove for receiving a ring-shaped portion of a sealing body, said groove bound by a radially extending head portion, wherein the groove comprises an additional recess extending into a thickened wall portion located at the end of the socket, this thickened wall portion extending between the inner side of the socket and the outer side of the socket, and a part of the socket extending from the groove inwards, having a greater inner diameter than the remaining part of the socket.

In such a socket pipe the ring-shaped portion of the sealing body will be easily maintained in the groove, owing to the additional recess.

The head portion is integral with the socket pipe.

In a socket pipe, obtained by injection moulding, the groove can be formed very easily by radial deformation of the head portion since said additional recess forms automatically a portion for retaining the ring-shaped portion of a sealing body so that in case of tensile forces it cannot easily be drawn out of the groove.

Moreover, the head portion, has only to be radially deformed and there is no more need of narrowing this head portion, so that the socket pipe can be manufactured in a much simpler way by means of much simpler equipment.

It is a special advantage that the free end of the head portion extends in radial direction so that the risk is avoided of breaking off an axially extending end of the head portion when same is falling.

Another advantage of a plastics socket pipe according to the invention is that, already during manufacture, the ring-shaped portion of the sealing body may be accomodated in the groove.

Advantageously, the additional recess has rounded edges in the thickened wall portion so as to obtain a plastics socket pipe with excellent strength properties.

The head portion extending in radial direction may extend inwardly so as to prevent completely that the ring-shaped portion of the sealing body is drawn out under tensile forces.

The invention includes a method of forming plastics socket pipe of theremoplastics material with an internal groove for receiving a ring-shaped portion of a sealing body, said groove bound by a radially extending head portion, wherein a socket pipe comprising an additional recess extends into a thickened wall portion located at the end of the socket, this thickened wall portion extending between the inner side of the socket and the outer side of the socket, while a part of the socket extending inwards from the groove has a greater inner diameter than the remaining part of the socket and is provided with a radially extending head portion.

A head portion being integral with the socket pipe is plasticized and deformed into a radial direction.

Such a method can be easily carried out because only the head portion integral with the socket has to be deformed in radial direction which may be done in a simple manner by plasticizing the head portion and pressing the head portion inwardly.

The free end of the head portion should be deformed such that it extends virtually in radial direction after deformation.

If desired, it may be recommendable to deform the free end of the head portion radially and inwardly.

Thus a good retention of the ring-shaped portion of the sealing body in the groove is ensured.

SURVEY OF THE DRAWINGS

FIG. 1 shows a longitudinal section of a plastics socket according to the invention.

FIG. 2 part of an end of an injection moulded socket pipe with a head portion attached thereto;

FIG. 3 the same portion of the end of an injection moulded socket pipe after radial deformation of the head portion and inwardly deforming said radial deformed head portion in accordance with one method, and FIG. 4 the same portion as shown in FIG. 2 of the end of a socket pipe after only radial deformation of the head portion with a male pipe part, in accordance with another method.

FIG. 1 shows an extruded double socket 1 of thermoplastics material, such as polyvinylchloride, with a socket part 2a at both ends and an internal stop flange 16 thereinbetween. In an internal groove 3 a ring-shaped portion 4 of a sealing body 18 is inserted, said ring-shaped portion 4 being integral with a sealing sleeve 5 and having a portion 4a at the groove and a portion 4b in additional recess 6. Besides the groove the socket end 2 has a greater inner diameter than the socket part 2a. Socket end 2 serves for accomodating the sleeve 5 of sealing body 18 when a male pipe part 21 is pushed into the socket part 2a, so that sleeve 5 engages sealingly the male pipe part 21 and on the other hand the outer diameter of male pipe part 21 can be substantially equal to the inner diameter of the socket part 2a having an inner wall 17.

Groove 3 for receiving the ring-shaped portion 4 comprises the additional recess 6 being located in the thickened wall portion 7 of the socket end 2, which thickened wall portion 7 extends between internal wall 8 of the socket end and external wall 9 of head portion 10 which extends beyond free end 11 of socket end 2.

The additional recess 6 in the thickened portion 7 is provided with rounded edges.

For forming the groove an end part 19 of head portion 10 is deformed in radial direction in such a manner that after deformation end part 19 of head portion 10 extends radially, preferably virtually in radial direction. For obtaining good strength properties when deforming end part 11, care is taken to ensure a good rounding 12 on the outside of the transition between the radially deformed end part 19 of head portion 10 and the external wall 9 of the final socket pipe.

Advantageously, head end 15 of end part 19 of head portion 10 may be deformed slightly inwardly, due to which opening 13 between free end 11 of the socket and the end 15 of the radially deformed end part 19 of head portion 10 is reduced, so as to avoid the ring-shaped portion 4 of sealing body 18 being drawn out in case of tensile forces.

For manufacturing an injection moulded socket pipe according to the invention, a socket pipe is formed by injection moulding and then partially heated, for instance, with hot air, by means of oil or by means of ultrasonic vibrations, causing at least a part of head portion 10 to obtain a temperature at which this portion may be deformed. To this effect temperatures of, for instance, between 120° and 200° C. come into consideration for polyvinylchloride.

When heating the head portion 10, it is advisable to carry this out very quickly in order to raise the production as much as possible.

The tool in the form of a beaded mould which is used for deforming head portion 10 has to have a raised temperature, for instance over 50° C. so as to avoid the radially deformed head portion 10 to become brittle which has a very disadvantageous influence on the strength properties.

When heating the head portion to be deformed radially, care should be taken to ensure such a heating of the head portion 10 that this head portion receives the desired plasticizing temperature all over so as to maintain the highest possible strength properties of the finished product.

Prior to deforming the head portion 10 it is advisable to install the ring-shaped portion 4 of sealing body 18 in additional recess 6 after which, by radial deformation of the end part 19 of the head portion 10 the desired fixation of this ring-shaped portion 4 may then be obtained.

In the present invention, it is of particular advantage that use is made of simple injection moulds for forming the starting product from which the injection moulded socket pipe may be formed by application of very simple tools.

When deforming part 19 of head portion 10, it is advisable to make also a rounding 14 on the inner side of the transition between deformed part of head portion 10 and the remaining non-deformed part of the head portion 10.

FIG. 4 shows a pipe 20 provided with a socket 2 and a male pipe part 21. In this embodiment the end part 19 of head portion 10 extends substantially in a radial direction after deformation. The ring-shaped portion 4 being held in the groove due to presence of additional recess 6.

The additional recess 6 extends substantially in axial direction according to this embodiment of the present invention.

What is claimed is:

1. The method of forming a socket pipe of plastic material having at one end thereof an opening and an internal groove for receiving a ring-shaped portion of a sealing body; said pipe also having a radially extending head portion defining one side of said groove; the wall of said one end of said socket pipe being thicker than the remainder of said socket pipe and a recess extending into said thicker portion of said wall; said radially extending head portion being of greater internal diameter than said thicker portion of said wall; said recess comprising an extension of said groove; said recess also being directed away from said opening; said method comprising the steps of positioning said sealing body in said one end of said socket pipe and locating a portion of said sealing body in said recess and another portion of said sealing body at said groove; deforming said radially extending head portion into engagement with the portion of said sealing body at said groove to capture and position said sealing body at said groove; permitting a portion of said sealing body to extend from said recess and said groove into the interior of said socket pipe to form a sealing ring for the end of an adjacent pipe inserted at said end of said socket pipe.

2. The method of claim 1, wherein said head portion is then further deformed from the radial direction so that its edge is re-entrantly directed axially toward the interior of the socket pipe to capture said sealing body.

3. The method as defined in claim 1, wherein the head portion is integral with the socket pipe and is plasticized and deformed first into a radial direction.

4. The method as defined in claim 1, wherein the recess in the thickened wall portion possesses rounded edges, and the radially deformed head portion is rounded in the region where the radially deformed head portion passes into the non-radially deformed head portion part.

5. A method as defined in claim 1, wherein the ring-shaped portion of the sealing body is integral with a sealing sleeve, which can be accomodated in the part of the socket extending from the groove inwards and having a greater inner diameter than the remaining part of the socket.

* * * * *